April 11, 1961  R. S. HINSEY  2,978,925
MECHANISM CONTROL
Filed June 5, 1957  2 Sheets-Sheet 1
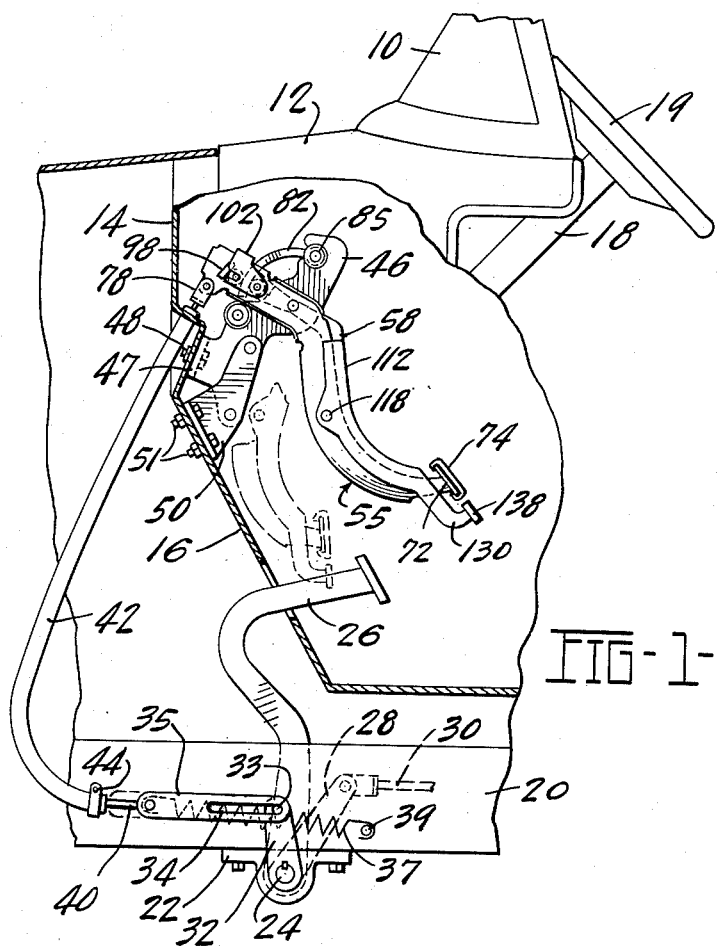
FIG-1-
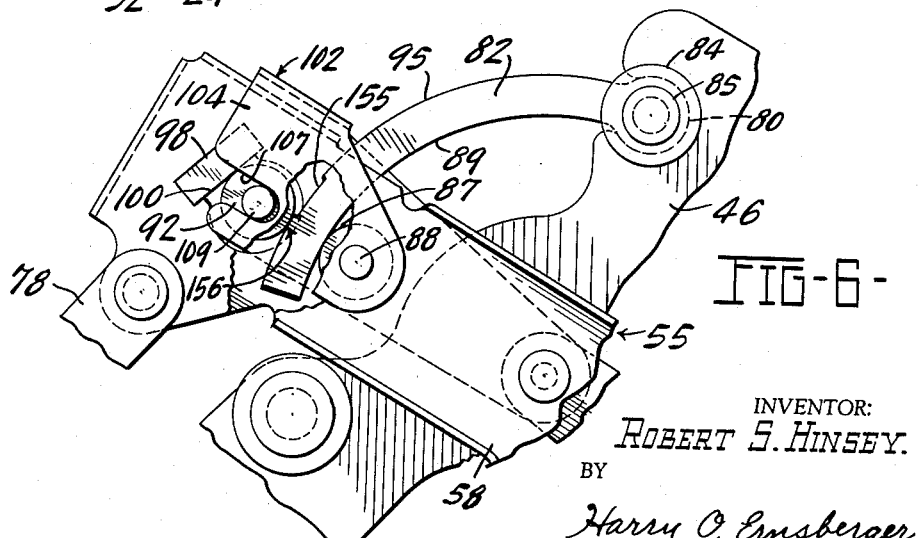
FIG-6-
INVENTOR:
ROBERT S. HINSEY.
BY
Harry O. Ernsberger
ATTY.

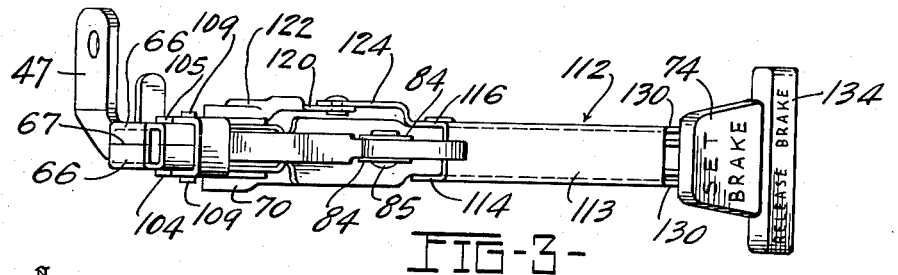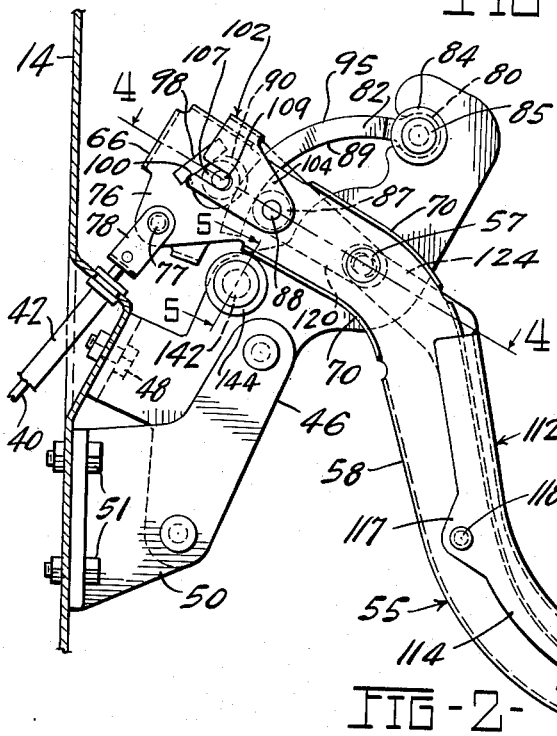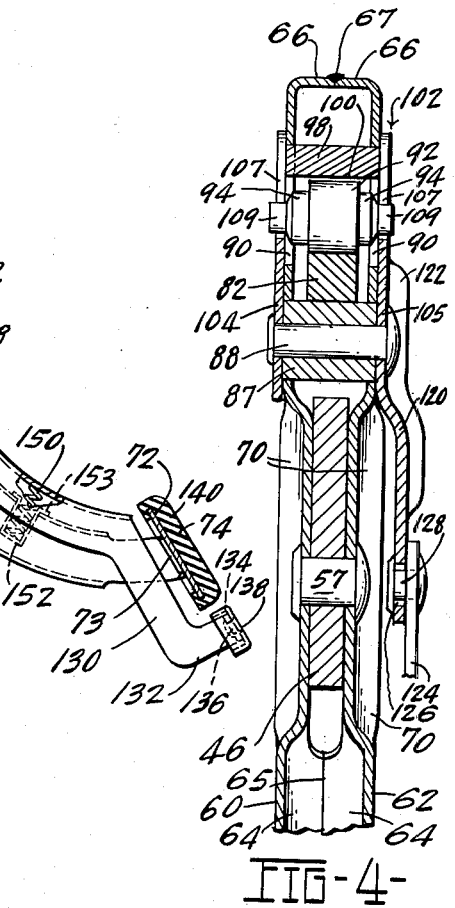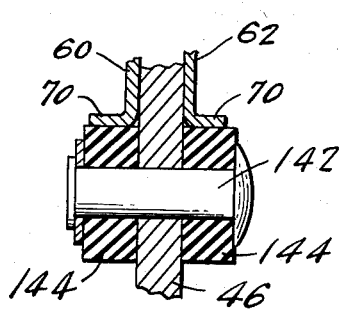

United States Patent Office 2,978,925
Patented Apr. 11, 1961

2,978,925
MECHANISM CONTROL

Robert S. Hinsey, Toledo, Ohio, assignor to The Bingham-Herbrand Corporation, Toledo, Ohio, a corporation of Ohio Filed June 5, 1957, Ser. No. 663,640
7 Claims. (Cl. 74—529)

This invention relates to mechanism control and more especially to a mechanism or arrangement for actuating or controlling the parking or emergency brakes of a vehicle.

The present invention embraces a foot operated lever mechanism or lever construction associated with means operable for holding or retaining the lever or lever construction in adjusted or brake setting positions, the means for retaining the foot operated lever in brake setting position being adapted to be released by foot operated means.

An object of the invention is the provision of a foot operated brake actuating means embodying a lever retaining or clutch means adapted for holding the lever arrangement in adjusted positions in conjunction with a releasing means for the lever retaining means disposed in juxtaposition with the lever arrangement so as to be conveniently released by foot pressure with a minimum of effort on the part of the operator.

Another object of the invention is the provision of a foot operated lever arranged to actuate or control the parking or emergency brakes of a vehicle, the arrangement embodying clutch means for retaining the lever is various brake setting positions and a release means for the clutch means having a foot operated component disposed adjacent the foot pad on the lever whereby the lever retaining means may be quickly and easily released by the operator's foot with a minimum of movement.

Another object of the invention is the provision of a foot operated lever having a foot pad portion in combination with means for retaining the lever in adjusted positions and a releasing means or member articulately mounted and having a pad portion disposed adjacent the foot pad of the lever which may be readily and easily actuated by the toe portion of the operator's shoe, the arrangement including resilient means for biasing the lever retaining means toward lever retaining position, the resilient means biasing the toe operated pad to a predetermined position.

Still another object of the invention is the provision of a foot operated lever embodying means for retaining the lever in adjusted positions and which is adapted to be rendered ineffective within a limited range of movement of the lever in a region near the initial or normal release position of the lever but which is rendered effective in the initial or normal position of the lever to avoid vibration or lost motion of the lever retaining means.

Another object of the invention is the provision of a foot operated lever arrangement for actuating vehicle brake mechanism having a foot pad portion and a means for retaining the lever arrangement in adjusted or brake setting positions, and a releasing means for the lever retaining means having a foot operated pad portion or component disposed adjacent the foot operated pad of the lever arrangement wherein both foot operated pads are in substantially aligned relation longitudinally of the lever arrangement and within convenient and easy operating position.

Another object of the invention is the provision of a lever arrangement embodying a lever retaining means and a releasing means therefor constructed and arranged whereby the lever retaining means is rendered ineffective to hold the lever arrangement in a partial brake setting position.

Further objects and advantages are within the scope and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view partly in section showing a portion of an operator's compartment of a vehicle illustrating a form of mechanism control of my invention;

Figure 2 is an elevational view of the foot operated brake lever construction illustrated in Figure 1;

Figure 3 is a top plan view of the construction illustrated in Figure 2;

Figure 4 is an enlarged fragmentary sectional view taken substantially on the line 4—4 of Figure 2;

Figure 5 is an enlarged detail sectional view taken substantially on the line 5—5 of Figure 2, and Figure 6 is an enlarged elevational view of a portion of the lever construction with certain parts illustrated in section and showing an arrangement for avoiding partial setting of the brake mechanism of a vehicle.

While I have illustrated a form of mechanism control of the invention installed in the operator's compartment of a vehicle and utilized for actuating or controlling the parking or emergency brakes, it is to be understood that I contemplate the association of my invention with any mechanism wherever the same may be found to have utility.

Referring to the drawings in detail, and first with respect to Figure 1, there is illustrated a portion of a vehicle construction and more particularly a portion of the vehicle operator's compartment. The portion of the vehicle illustrated is inclusive of a windshield 10, a cowl portion 12, a dashboard or fire wall 14, a toe board 16 and a steering post 18 supporting a steering wheel 19. A side sill or frame member 20 is illustrated forming a part of the vehicle chassis frame construction.

Secured to the side frame member 20 and a similar frame member on the opposite side of the vehicle are brackets 22, one of which is shown in Figure 1. The brackets 22 form journal supports for a shaft 24 extending transversely of the vehicle, a service brake pedal construction 26 being mounted upon the shaft 24 and adapted to actuate the service brakes of the vehicle (not shown).

Secured upon the shaft 24 is an arm 28 connected by means of a rod 30, cable or other suitable means with parking brake mechanism operative upon a pair of road wheels (not shown) of the vehicle. The service brakes of the vehicle, which may be of conventional hydraulically operated type are connected to the service brake pedal 26 in any suitable manner.

Secured upon the shaft 24 is an arm 32 equipped at its distal end with a pin or stub shaft 33 arranged for traverse in a slot 34 formed in an elongated link or member 35. The member 35 is biased toward the brake release position under the influence of a contractile coil spring 37 connected at one end with the member 35, the other end of the spring being anchored to a pin 39 or other suitable means secured to the frame member 20 or other portion of the vehicle frame. Connected to an end of the member or link 35 is a flexible cable 40 arranged for slidable movement within an enclosure, sheath or tubular guide 42. The lower end of the sheath or guide 42 may be anchored to the frame member 20 by means of a securing member or clamp 44.

The other end of the sheath or cable guide 42 extends through an opening in the dashboard or fire wall 14 and may be secured to the fire wall by suitable means (not shown). The pin and slot arrangement designated 33, 35 provides a lost motion connection whereby the service brake pedal 26 may be depressed or operated without effecting relative movement of the member 35.

The mechanism control of the invention is inclusive of a support, supporting member or plate 46 having a portion 47 which may be secured to the fire wall 14 by means of a bolt 48 and also secured to a bracket 50 carried by the toe board construction 16 and being secured thereto by bolts 51 or other suitable means.

The lever or lever construction 55 is articulately or pivotally mounted on the support or member 46 by means of a rivet or stub shaft 57 forming a fulcrum for the lever. The lever construction 55 includes a lever body 58 formed of mating sections or components 60 and 62 fashioned of sheet metal. The lower portions of the sections 60 and 62 are formed with inwardly projecting flanges 64 which are in abutting relation and welded along a juncture line 65.

The upper extremities of the sections 60 and 62 are formed with abutting end flanges 66 which are welded together at the region 67 as shown in Figure 4. Portions of the lever sections 60 and 62 adjacent the fulcrum 57 and support 46 are formed with outwardly turned flanges 70 in order to strengthen this region of the lever.

The lower end region of the lever body 58 is provided with a metal foot pad 72 which is welded to transversely extending flanges 73 of the mating sections 60 and 62, the pad or metal member 72 being formed to receive and support a rubber pad or foot receiving member 74 as particularly shown in Figure 2.

The upper region of the components 60 and 62 of the lever construction are each formed with a forwardly extending portion 76, these portions being provided with aligned openings to receive a pin or shaft 77 joining a clevis 78 to the lever construction. The upper end of the flexible cable 40 is secured to the clevis 78 whereby movement of the lever construction 55 about the fulcrum 57 in a clockwise direction exerts a pull on the cable 40 to apply the parking brakes of the vehicle.

The lever arrangement is provided with a means or clutch arrangement for retaining the lever in adjusted or brake setting positions. As particularly shown in Figure 2, the support or bracket 46 is formed with an opening to receive an enlarged circularly shaped end or head portion 80 of an arcuately shaped bar or member 82. The throat of the opening that receives the circular portion 80 is restricted so as to prevent dislodgement of the bar 82 with respect to the support 46. The bar is held against lateral displacement by means of washers or disks 84 which are held in place by means of a rivet 85.

In the embodiment illustrated, the bar 82 is of arcuate configuration, the upper surface 95 and the lower surface 89 being radii generated about the axis of the fulcrum shaft or rivet 57. As particularly shown in Figure 4, the opposed walls formed by the mating sections 60 and 62 are provided with aligned openings to receive a cylindrical sleeve or bushing member 87 journally supported upon a rivet or stub shaft 88 passing through an axial opening in the cylindrical member 87, the head portions of the rivet 88 serving to hold the member 87 in proper position. The cylindrical sleeve 87 forms an abutment engaging the inner arcuate surface 89 of the bar 82.

The sections 60 and 62 of the lever construction are formed with aligned openings 90 of a dimension or size to accommodate a lever retaining means, clutch member or roller 92. The clutch member or roller 92 is formed with suitable shoulder portions or tenons 94 which extend into the clearance openings 90 formed in the lever sections 60 and 62. The roller or clutch member 92 is adapted for cooperative relation or locking engagement with the arcuate or clutching upper surface 95 of the bar 82.

As shown in Figures 2, 4 and 6, the uper end zones of the mating sections 60 and 62 are provided with rectangularly shaped openings to snugly accommodate a rectangularly shaped block or clutch member 98 which has a surface 100 angularly arranged with respect to the arcuate surface 95 of the bar 82 so as to provide two generally convergent surfaces 95 and 100 between which the roller or clutch member 92 is disposed, the surfaces at the region of engagement of the roller 92 therewith forming a wedging angle to frictionally hold or lock the clutch member or roller 92 and hence the lever construction 55 in adjusted or brake setting positions.

The rectangularly shaped block or clutch member 98 is hardened and may be welded to the lever sections 60 and 62 if desired.

While the arcuate surfaces 89 and 95 are generated about the axis of the fulcrum 57, relative pivotal movement of bar 82 is provided through the positioning of the circular head 80 in the circular opening in the support 46 for the bar to permit slight movement of the arcuate bar to compensate for inaccuracies in manufacture so that the clutch member or roller 92 will always properly engage the bar to effect a locking of the lever in brake setting positions.

The arrangement is inclusive of means for controlling the clutch or lever retaining means or clutch member to bias the clutch member toward clutching position and to effect a release of the lever retaining clutch in order to release the brake mechanism. As particularly shown in Figures 2, 3 and 4, a generally U-shaped member 102 is formed with parallel wall portions 104 and 105 which straddle the lever sections or components 60 and 62 adjacent their upper ends. The parallel wall portions of member 102 are formed with openings to receive and accommodate the rivet or stub shaft 88 whereby the member 102 is supported upon the lever construction for pivotal movement relative to the lever about the axis of the rivet or stub shaft 88.

The walls or wall portions 104 and 105 of member 102 are provided with open ended slots 107, the edge walls defining the slots being substantially parallel and spaced to snugly yet slidably and rotatably accommodate cylindrically shaped tenons 109 formed on the clutch member or roller 92 as shown in Figures 4 and 6. Pivotal movement of the U-shaped clutch controlling member 102 moves the lever retaining means or clutch 92 into effective or ineffective positions.

An actuating means or supplemental lever for controlling the position and movement of the member 102 is articulately or pivotally mounted upon the lever 58. As particularly shown in Figures 2 and 3, the supplemental lever or clutch control member actuating means 112 is of generally U-shaped configuration in cross section having parallel walls or wall portions 114 and 116 which straddle the lever body or member 58. The side walls 114 and 116 of the supplemental lever 112 are formed with projections or ear portions 117 provided with aligned openings which register with aligned openings in the components 60 and 62 of the lever body, the openings adapted to receive and accommodate a stub shaft or rivet 118 which provides a pivotal support or fulcrum for the supplemental lever 112. The wall portion 105 of the clutch controlling member 102 is extended to form an arm 120 which is formed throughout a portion of its length with outwardly or transversely turned flanges 122 to lend rigidity to the arm. The wall 116 of the supplemental lever 112 is formed with a forwardly extending arm or projection 124, the end region of which overlaps the end region of the arm 120 in the manner shown in Figures 2, 3 and 4.

The arm 120 is formed with an elongated slot or opening 126 which accommodates a rivet 128 extending through the slot and through an opening formed in the arm 124 of the supplemental lever 112. The rivet 128 and the slot 126 form an articulate connection between the supplemental lever 112 and the clutch controlling member 102 whereby pivotal movement of the supplemental lever 112 about the axis of its pivotal support 118 causes movement of the clutch controlling member 102 about its fulcrum or pivotal support 88. Through this arrangement the clutch member or roller 92 may be moved out of clutching or locking engagement with the block 98 and bar 82 by clockwise movement of the supplemental lever 112 about its fulcrum 118 as viewed in Figure 2.

The bight portion 113 of the supplemental lever 112 terminates adjacent the upper edge region of the foot pad portion 72 as shown in Figure 2. The side walls 114 and 116 of the supplemental lever are formed with extensions 130 which straddle the portion of the lever body 58 immediately beneath the foot pad portion 72. The extensions 130 are formed with laterally extending portions or flanges 132 to which is secured a pad or toe plate 134 secured to the projections by means of rivets 136.

The upper planar surface 138 of the pad 134 is preferably in a plane parallel to but slightly below the plane of the surface 140 of the foot pad portion 74 on the lever body 58 so that application of foot pressure on the pad 140 to actuate the brake may be applied without the operator's foot applying pressure to the release pad 138 on the supplemental lever 112. The pad 134 is preferably formed of metal but may be covered with a pad of rubber or other resilient material.

The arrangement includes means carried by the support 46 for determining the initial or normal position of the brake actuating lever 58 when the brakes are in fully released position. The support 46 is provided with an opening accommodating a stub shaft or rivet 142 as shown in Figures 2 and 5. Mounted upon the stub shaft 142 at each side of the support 46 is a circular disk or cylinder 144 fashioned of semi-hard rubber or other suitable material providing resilient abutment or lever movement limiting means adapted to be engaged by one pair of flanges 70 formed on the lever components 60 and 62, the flanges being shown in engagement with the abutment disks 144 in Figures 2 and 5.

Depression of the toe pad 134 effects a disengagement of the clutch roller 92 with the surface 100 of block 98 and the upper surface 95 of the bar 82 to release the brake lever for movement toward brake releasing position.

The supplemental lever 112 is normally biased or urged in a counterclockwise direction about the axis of shaft 118 under the influence of an expansive coil spring 150 which is supported in a cylindrically-shaped metal thimble or cup 152 contained in a suitable opening formed in the central region of the lever body 58 as shown in Figure 2. The metal thimble 152 is formed at its open end with an outwardly extending circular flange 153 which positions the thimble or cup 152 in the lever construction 158.

When the operator effects a release of the clutch member by depression of the pad 134 by the application of the toe portion of his shoe to the pad, the brake lever 58 immediately initiates its return movement to release position and the toe of the operator's shoe may slip from the pad 134. When this occurs, the inertia of the supplemental lever 112 to resist return movement delays the instant return of the supplemental lever to clutch engaged position even though it is biased to such position by the spring 150. Usually the period of delay of the supplemental lever 112 to return to its normal position is sufficient to permit the brake lever 58 to return to its release position in engagement with the rubber abutment blocks or stop members 144. However in certain instances of release of the supplemental lever 112, dependent upon the amount of angular movement of the lever 58 to be traversed to release position, it has been found that the supplemental lever may return to its normal position engaging the clutch roller 92 with the block 98 and bar 82 prior to completion of the return stroke of the brake actuating lever 58 to its initial release position. Means is provided to avoid premature engagement of the clutch roller 92 with the block 98 and bar 82 before the lever 58 reaches its full release position. As particularly shown in Figure 6, a portion of the bar 82 adjacent the full release position of the lever 58 is formed with a recess 155. The position of the recess 155 is just short of the full release position of the lever 58 so that when the lever is in its fully released position, the clutch roller 92 is in engagement with a surface 156 of the bar 82 and the surface 100 of block 98 to maintain the roller 92 in a fixed position preventing rattle or noise of the roller.

In the event that a supplemental lever 112 reaches its initial position under the influence of spring 150 before the lever 58 has reached its fully released position, the clutch roller 92 will be in the region of the recess 155 so as to be out of wedging engagement with the bar 82 and the surface 100 of the clutch block 98. As no restraint against further movement of the lever 58 toward released position is set up by a wedging condition of the roller 92 between the surfaces 95 and 100, the lever 58 will continue uninterrupted to its release position as shown in Figures 2 and 6. When the lever 58 reaches release position, the clutch roller 92 is in contact or engagement with the surface 156 of the bar 82 and the surface 100 of the block 98 so that no relative movement or vibration of the roller takes place as might otherwise occur if the roller 92 were not in engagement with dual surfaces.

The operation of the arrangement of lever construction is as follows: The brake actuating lever construction 55 is shown in brake release position in the several figures of the drawings. In brake release position, the spring 37 has fully retracted the brake actuating cable 40 to brake release position and the brake lever 58 is in engagement with the rubber abutment blocks 144 which serve to define the position of the brake lever in its brake release position. In order to set the emergency or parking brakes of the vehicle, the operator, by foot pressure applied to the surface 140 of the foot pad 74 rotates the lever 58 in a clockwise direction as viewed in Figures 1 and 2 about the shaft or rivet 57 as a fulcrum.

As the spring 150, acting through the supplemental lever 112, biases the clutch control member 102 in a clockwise direction about its pivotal support 88, the walls of the slots 107 in the clutch member urge the clutch roller or lever retaining means toward lever locking or clutching position between the block 98 and the upper surface of the arcuate bar 82. Thus during movement of the lever 58 toward brake setting position the clutch or roller 92 is continuously urged toward wedging engagement or contact with the block 98 and the bar 82.

When the movement of the lever 58 through the medium of the brake cable 40 has drawn up or tensioned the vehicle brakes to bring them to a set position, the clutch member or roller 92 is wedged between the surface 100 of the block 98 and the surface 95 of the bar 82 and holds the vehicle brakes and the lever 58 in brake setting position.

When it is desired to release the vehicle parking or emergency brakes, the operator applies pressure through the toe of his shoe to the pad 134 formed at the lower end or extremity of the supplemental lever 112, which pressure moves the supplemental lever 112 in a clockwise direction about the fulcrum or pivotal support 118. This movement of the supplemental lever 112 through the articulate connection provided by the slot 126 in arm 120 and rivet 128 is transferred to the clutch control member 102, causing the latter to be swung or rotated in a counterclockwise direction as viewed in Figure 2 about its pivotal support or shaft 88.

During counterclockwise movement of the clutch control member 102, the edge walls of the slots 107 in the leg portions of member 102 engaging the tenons 109 on the clutch roller 92 move the clutch roller out of wedging engagement or frictional contact with the block 98 and the bar 82 so as to effect a release of the lever retaining means or locking member 92. The lever 58, being released, is immediately rotated about its fulcrum 57 under the influence of the brake return spring 37 transferred to the lever through the cable 40. The lever 58 moves toward release position until the flange portions 70 on the lever sections or components 60 and 62 engage the rubber disks 144, the disks not only cushioning the impact of the return stroke of the brake lever but also defining or determining the initial or release position of the lever.

In the event that the vehicle operator depresses the toe plate 134 to release the clutch and his foot is removed from the plate 134 before the lever 58 reaches full release position, the clutch roller 92 registers with the recess 155 in the bar 82 and this relief prevents the wedging engagement of the clutch roller which would otherwise restrain the completion of the movement of lever 58 to release position. It is to be understood that the recess 155 may be made of sufficient length to prevent partial setting of the brake, assuring complete return of the lever 58 to its initial release position.

It will be noted from Figure 3 that the foot pad 74 on the brake lever 58 and the toe release pad 134 on the supplemental brake releasing lever 112 are in close relation and generally aligned in the plane of movement of the lever 58 for ease in manipulation in setting and releasing the brake mechanism.

It is apparent that, within the scope of the invention, modifications and different arrangements may be made other than is herein disclosed, and the present disclosure is illustrative merely, the invention comprehending all variations thereof.

I claim:

1. Apparatus of the character disclosed for controlling parking brakes of a vehicle, in combination, a support, a foot operated main lever fulcrumed intermediate its ends on the support, means operatively connected with the foot operated lever and support for retaining the lever in various positions of adjustment, said foot-operated main lever being equipped with a foot pad, means connecting the foot operated main lever with the vehicle brake mechanism to be controlled, means adapted for controlling the lever retaining means, a supplemental lever fulcrumed on the main lever and having operative connection with the lever retaining control means, resilient means biasing said lever retaining means toward lever retaining position, said supplemental lever being provided with a toe pad extending rearwardly of the foot pad on the lever, said foot pad and toe pad being in adjacent relation and generally aligned with a central longitudinal plane through the lever, said supplemental lever being arranged whereby pressure on the toe pad effects release of the lever retaining means, and means independent of the supplemental lever for rendering said lever retaining means ineffective throughout a portion of the travel of the main lever.

2. Mechanism for controlling brakes of a vehicle including, in combination, a support, a foot operated main lever fulcrumed intermediate its ends on the support, a foot pad on the lever, a longitudinally curved bar anchored to the support, a block carried by the lever, a roller cooperatively associated with said bar and block and engageable therewith for holding the foot operated lever in brake setting positions, a roller control member pivotally mounted on the lever, a supplemental lever pivotally supported on the foot operated main lever and having operative connection with the control member adjacent the fulcrum of the main lever, said supplemental lever having a portion extending beneath and beyond the foot pad, a toe pad supported on the extending portion of the the supplemental lever, said foot and toe pads being substantially in alignment longitudinally of the foot operated lever, stop means for determining the brake release position of the foot operated lever, resilient means for normally biasing the roller toward engagement with said bar and block, said supplemental lever being arranged whereby pressure applied to the toe pad effects release of the roller, and a recess formed in said bar arranged adjacent to but spaced from brake release position of the roller for rendering the roller ineffective to hold the foot operated main lever in a position wherein the roller is in registration with the recess.

3. Mechanism for controlling brakes of a vehicle including, in combination, a support, a foot-operated main lever fulcrumed intermediate its ends on the support, a foot pad mounted on the main lever, a longitudinally curved bar anchored to the support, a block carried by the lever, a roller cooperatively associated with said bar and block and engageable therewith for holding the foot-operated lever in brake-setting positions, a control member carried by the main lever and arranged for engagement with the roller, a supplemental lever pivotally supported on the foot-operated main lever and having a portion extending beneath and beyond the foot pad, said supplemental lever engaging said control member adjacent the fulcrum of the main lever, a toe pad supported on the extending portion of the supplemental lever, a resilient stop means for determining the brake release position of the foot-operated lever, resilient means for normally biasing the roller into frictional engagement with said bar and block, said supplemental lever being arranged whereby pressure applied to the toe pad effects release of the roller.

4. Apparatus for controlling parking brakes of a vehicle in combination, a support, a foot operated lever fulcrumed intermediate its ends on said support, means operatively connected with said lever and said support for retaining the lever in brake-set and brake-release positions, means arranged to connect the lever on one end with said parking brakes, a foot pad carried by said lever at its other end, means for controlling the lever retaining means including a second lever pivotally connected to and supported by said first mentioned lever at a point between said fulcrum and said foot pad, a member pivotally jointed to said second lever, said member being articulately mounted for relative movement on said first mentioned lever and connected with said retaining means, and a toe pad carried by said second lever.

5. Apparatus for controlling parking brakes as in claim 4, and wherein said toe pad extends rearwardly beyond said foot pad and is aligned therewith.

6. Apparatus for controlling parking brakes as in claim 4, and wherein said pivots and said articulate mounting are substantially on the longitudinal center line of said first lever.

7. Apparatus for controlling parking brakes as in claim 4, and having spring means located between said first mentioned and said second levers for urging said retaining means toward the retaining position.

References Cited in the file of this patent

UNITED STATES PATENTS

| | | |
|---|---|---|
| 630,281 | Alden | Aug. 1, 1899 |
| 904,148 | Potter | Nov. 17, 1908 |
| 1,206,673 | Cobb | Nov. 28, 1916 |
| 1,608,382 | Fox | Nov. 23, 1926 |
| 2,014,300 | Strobridge | Sept. 10, 1935 |
| 2,141,778 | Wenn | Dec. 27, 1938 |
| 2,233,329 | Sprink | Feb. 25, 1941 |
| 2,299,508 | Skareen | Oct. 20, 1942 |
| 2,309,454 | Heller | Jan. 26, 1943 |
| 2,587,725 | Hinsey | Mar. 4, 1952 |
| 2,875,641 | Powell | Mar. 3, 1959 |